US012561828B2

(12) United States Patent
Jung et al.

(10) Patent No.: US 12,561,828 B2
(45) Date of Patent: Feb. 24, 2026

(54) METHOD AND APPARATUS FOR DETECTING VOICE-BASED DEEPFAKE VIDEO

(71) Applicant: Foundation of Soongsil University-Industry Cooperation, Seoul (KR)

(72) Inventors: Sou Hwan Jung, Seoul (KR); Ki Hun Hong, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 270 days.

(21) Appl. No.: 18/491,381

(22) Filed: Oct. 20, 2023

(65) Prior Publication Data

US 2025/0045946 A1     Feb. 6, 2025

(30) Foreign Application Priority Data

Aug. 1, 2023     (KR) ......................... 10-2023-0100233

(51) Int. Cl.
| | |
|---|---|
| *G06V 40/16* | (2022.01) |
| *G06T 7/70* | (2017.01) |
| *G10L 25/21* | (2013.01) |
| *G10L 25/57* | (2013.01) |
| *G06V 20/40* | (2022.01) |

(52) U.S. Cl.
CPC ................ *G06T 7/70* (2017.01); *G10L 25/21* (2013.01); *G10L 25/57* (2013.01); *G06T*
*2207/10016* (2013.01); *G06T 2207/20081* (2013.01); *G06T 2207/30196* (2013.01)

(58) Field of Classification Search
CPC . G06T 2207/30196; G06T 2207/10016; G06T 2207/20081; G06T 7/70; G10L 25/57; G10L 25/21
See application file for complete search history.

(56) References Cited

U.S. PATENT DOCUMENTS

| | | | |
|---|---|---|---|
| 11,386,580 B1 * | 7/2022 | Ulianov | ................ G06T 7/0002 |
| 2021/0209388 A1 * | 7/2021 | Ciftci | ..................... G06N 3/045 |

(Continued)

FOREIGN PATENT DOCUMENTS

| | | |
|---|---|---|
| KR | 10-2275803 B1 | 7/2021 |
| KR | 10-2399121 B1 | 5/2022 |

(Continued)

OTHER PUBLICATIONS

Chugh, Komal, et al. "Not made for each other-audio-visual dissonance-based deepfake detection and localization." Proceedings of the 28th ACM international conference on multimedia. 2020. (Year: 2020).*

(Continued)

*Primary Examiner* — Hadi Akhavannik
(74) *Attorney, Agent, or Firm* — Stein IP, LLC

(57) ABSTRACT

The method for detecting a deepfake video according to one embodiment of the present invention comprises receiving a target video, which is a video containing a person speaking; analyzing the direction of the person's face in time series for each of an image and voice constituting the target video; and determining whether the target video is a deepfake video by comparing analysis results of the image and the voice.

6 Claims, 5 Drawing Sheets

(56)                    References Cited

U.S. PATENT DOCUMENTS

2022/0121868 A1 *    4/2022    Chen ........................ G10L 17/22
2022/0269761 A1 *    8/2022    Steelberg ............. G06V 40/172

FOREIGN PATENT DOCUMENTS

KR      10-2023-0013236 A      1/2023
KR      10-2023-0017650 A      2/2023

OTHER PUBLICATIONS

Barnard, Mark, and Wenwu Wang. "Audio Head Pose Estimation using the Direct to Reverberant Speech Ratio." (2016). (Year: 2016).*
Yang, Xin, Yuezun Li, and Siwei Lyu. "Exposing deep fakes using inconsistent head poses." ICASSP 2019—2019 IEEE international conference on acoustics, speech and signal processing (ICASSP). IEEE, 2019. (Year: 2019).*

* cited by examiner

<u>200</u>

METHOD AND APPARATUS FOR DETECTING VOICE-BASED DEEPFAKE VIDEO

CROSS-REFERENCE TO RELATED APPLICATIONS

This application claims the benefit of Korean Application No. 10-2023-0100233, filed Aug. 1, 2023, in the Korean Intellectual Property Office. All disclosures of the document named above are incorporated herein by reference.

TECHNICAL FIELD

The present invention relates to a method and apparatus for detecting deepfake videos based on voice, and more specifically, to a deepfake video detection method and apparatus for detecting whether the voice included in a video has been altered.

BACKGROUND ART

With the advancement of deep learning technology, voice synthesis technology has advanced to a level where it is difficult for humans to distinguish between fake voices (i.e., deepfake voices). Therefore, the possibility of abuse such as voice fishing or the creation and distribution of fake news is increasing, and in order to respond to this, technology to detect deepfake voices (modulated or fake voices) is being researched.

Furthermore, deepfake videos are also emerging as a social problem. In deepfake videos, the medium that delivers incorrect information to viewers is mainly voice. The image is used to mislead viewers into thinking that the person included in the image is the target, and the delivery of incorrect information is done by altering the person's voice. In fact, a deepfake video of the president of Ukraine, which is currently at war, declaring surrender was widely circulated on social media.

In conventional technology, deepfake videos are detected based on whether the shape of the mouth matches the voice using lip-syncing. However, this technology has limitations in that it can manipulate the shape of the mouth in a video to match the voice.

Accordingly, there is a need for a deepfake video detection method and apparatus that can more easily detect deepfake videos based on voice.

DISCLOSURE

Technical Problem

The present invention seeks to provide a deepfake video detection method and apparatus that determines whether the voice included in the video has been altered using information about the facial direction of the person appearing in the video. The objects of the present invention are not limited to the objects mentioned above, and other objects and advantages of the present invention that are not mentioned can be understood by the following description and will be more clearly understood by the examples of the present invention. Additionally, it will be readily apparent that the objects and advantages of the present invention can be realized by the means and combinations thereof indicated in the claims.

Technical Solution

A method for detecting a deepfake video according to one embodiment of the present invention comprises receiving a target video, which is a video containing a person speaking; analyzing the direction of the person's face in time series for each of an image and voice constituting the target video; and determining whether the target video is a deepfake video by comparing analysis results of the image and the voice.

Preferably, analyzing the direction of the person's face in time series may comprise analyzing the direction of the person's face in the image in time series using a pre-trained object detection deep learning model.

Preferably, analyzing the direction of the person's face in time series may comprise analyzing the direction of the person's face in the voice in time series based on DRR (Direct to Reverberant speech energy ratio).

Preferably, determining whether the target video is a deepfake video may comprise determining whether the target video is a deepfake video by comparing the direction of the face in the image and the direction of the face in the voice according to the timeline.

Preferably, determining whether the target video is a deepfake video may comprise determining whether the target video is a deepfake video by comparing a time when a direction of the face in the image is changed and a time when a direction of the face in the voice is changed according to timeline.

Further, an apparatus for detecting a deepfake video according to one embodiment of the present invention may comprise an input unit for receiving a target video, which is a video containing a person speaking; an analysis unit for analyzing a direction of the person's face in time series for each of an image and voice constituting the target video; and a detection unit for determining whether the target video is a deepfake video by comparing analysis results of the image and the voice.

Preferably, the analysis unit may analyze the direction of the person's face in the image in time series using a pre-trained object detection deep learning model.

Preferably, the analysis unit may analyze the direction of the person's face in the voice in time series based on DRR.

Preferably, the detection unit may determine whether the target video is a deepfake video by comparing the direction of the face in the image and the direction of the face in the voice according to the timeline.

Preferably, the detection unit may determine whether the target video is a deepfake video by comparing a time when the direction of the face in the image is changed and a time when the direction of the face in the voice is changed according to the timeline.

Advantageous Effects

A deepfake video detection method and apparatus based on voice according to an embodiment of the present invention uses information about the face direction of a person appearing in the video to determine whether the voice included in the video has been altered, thereby yielding an effect of easily detecting a deepfake video.

DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
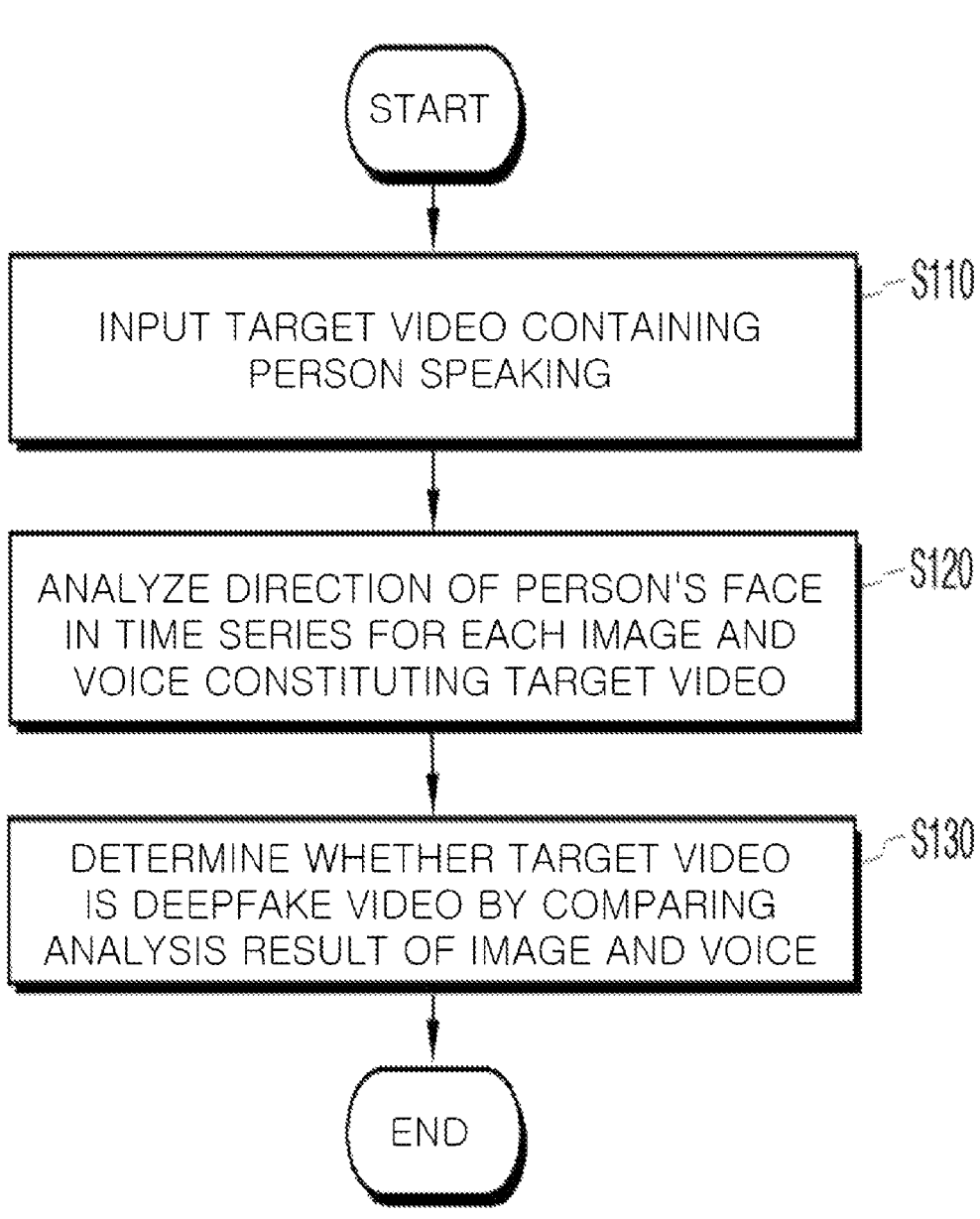
FIG. 1 is a flowchart of a voice-based deepfake video detection method according to an embodiment of the present invention.

The various embodiments provided in this disclosure are provided for the purpose of clearly explaining the technical concepts of the present disclosure and are not intended to limit it to specific embodiments. The technical concepts of the present disclosure encompass various modifications, equivalents, alternatives, and combinations selectively chosen from all or some of the various embodiments disclosed in this disclosure. Furthermore, the scope of the technical concepts of the present disclosure is not limited to the specific embodiments provided below or their detailed descriptions.

Technical or scientific terms used in this disclosure, unless otherwise defined, may have meanings that are generally understood by those skilled in the art to which the present disclosure belongs.

Expressions used in this disclosure such as "includes," "may include," "comprises," "may comprise," "has," "may have," and the like mean that the target feature (e.g., function, operation, or component, etc.) exists and do not exclude the presence of other additional features. That is, these expressions should be understood as open-ended terms that imply the possibility of including other embodiments.

Singular expressions used in this disclosure may, unless the context indicates otherwise, include plural meanings, and this also applies to singular expressions in the claims.

Expressions such as "first," "second" and the like used in this disclosure are used to distinguish one entity from another entity when referring to multiple similar entities and do not limit the order or importance of these entities.

Expressions such as "A, B, and C," "A, B, or C," "at least one of A, B, and C," or "at least one of A, B, or C" used in this disclosure may include all possible combinations of the listed items. For example, "at least one of A or B" may refer to (1) at least one A, (2) at least one B, or (3) at least one A and at least one B.

The expression "~ based on" used in this disclosure is used to describe one or more factors that influence the act or action of deciding or judgment described in the phrase or sentence in which the expression is included, and it does not exclude additional factors that may influence the act or action of deciding or judgment.

The various embodiments of the present disclosure are described below concerning the accompanying drawings. In the drawings and the description of the drawings, substantially equivalent components may be assigned the same reference numerals. Additionally, in the descriptions of the various embodiments below, the duplication of descriptions of the same or corresponding components may be omitted, but this does not mean that such components are not included in the respective embodiments.

Hereinafter, preferable embodiments according to the present invention are described in detail regarding the accompanying drawings.

FIG. 1 is a flowchart of a voice-based deepfake video detection method according to an embodiment of the present invention.

In step S110, the deepfake video detection apparatus receives a target video, which is a video containing a person speaking.

For example, the target video may be a video that shows the president giving a speech on a podium. Here, the president can deliver a speech while looking at the camera in front of him and occasionally turning his head to the left or right to look at the people on his left or right.

In step S120, the deepfake video detection apparatus analyzes the direction of the person's face in time series for each of the image and voice constituting the target video.

In other words, the deepfake video detection apparatus can analyze the direction of a person's face in time series from t=0, which is the time point when the target video starts. At this time, the deepfake video detection apparatus can analyze the direction of the person's face from the images constituting the target video, and separately analyze the direction of the person's face from the voices.

For example, a deepfake video detection apparatus can calculate the direction of a person's face by tracking changes in the positions of the person's eyes, nose, and mouth in the images on the time axis.

In another embodiment, a deepfake video detection apparatus can analyze the direction of a person's face in the images in time series using a pre-trained object detection deep learning model.

At this time, the pre-trained object detection deep learning model may be a deep learning model trained using a dataset that includes face photos of several people from various angles and is enhanced by flipping them left and right. For example, the deep learning model may be YOLO (You only look once) v3. In addition, the deep learning model can receive a photo of a person's face and determine the angle of the face based on the front, such as 30 degrees to the right and 25 degrees to the left.

Meanwhile, a deepfake video detection apparatus can calculate the direction of a person's face appearing in the images at regular intervals along the time axis. For example, a deepfake video detection apparatus can analyze the images in time series so that the angle of the face includes the angle most biased to the left or right and 0 degrees (frontal). In other words, a deepfake video detection apparatus can analyze the video in time series to include the left maximum, right maximum, and minimum values of the face angle.

Figure 5:
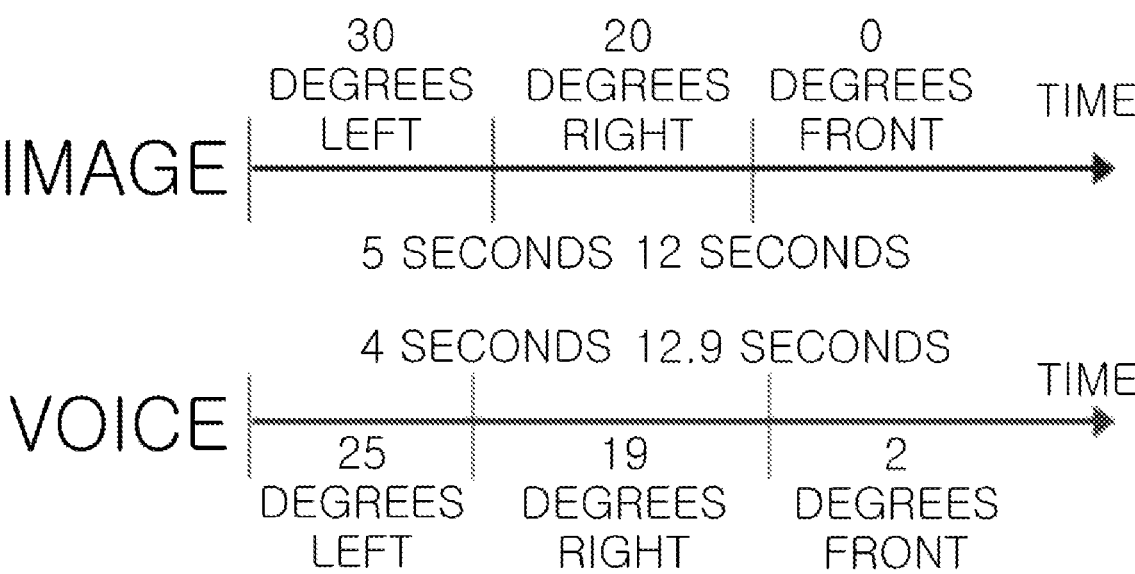

Referring to FIG. 5, the deepfake video detection apparatus can analyze that the angle of the person's face changes in the order of 30 degrees left, 20 degrees right, and 0 degrees (frontal), and the times when the changes start are 0 seconds, 5 seconds, and 12 seconds, respectively.

In another embodiment, a deepfake video detection apparatus can analyze the direction of a person's face in the voices in time series based on Direct to Reverberant speech energy Ratio (DRR).

Figure 3:
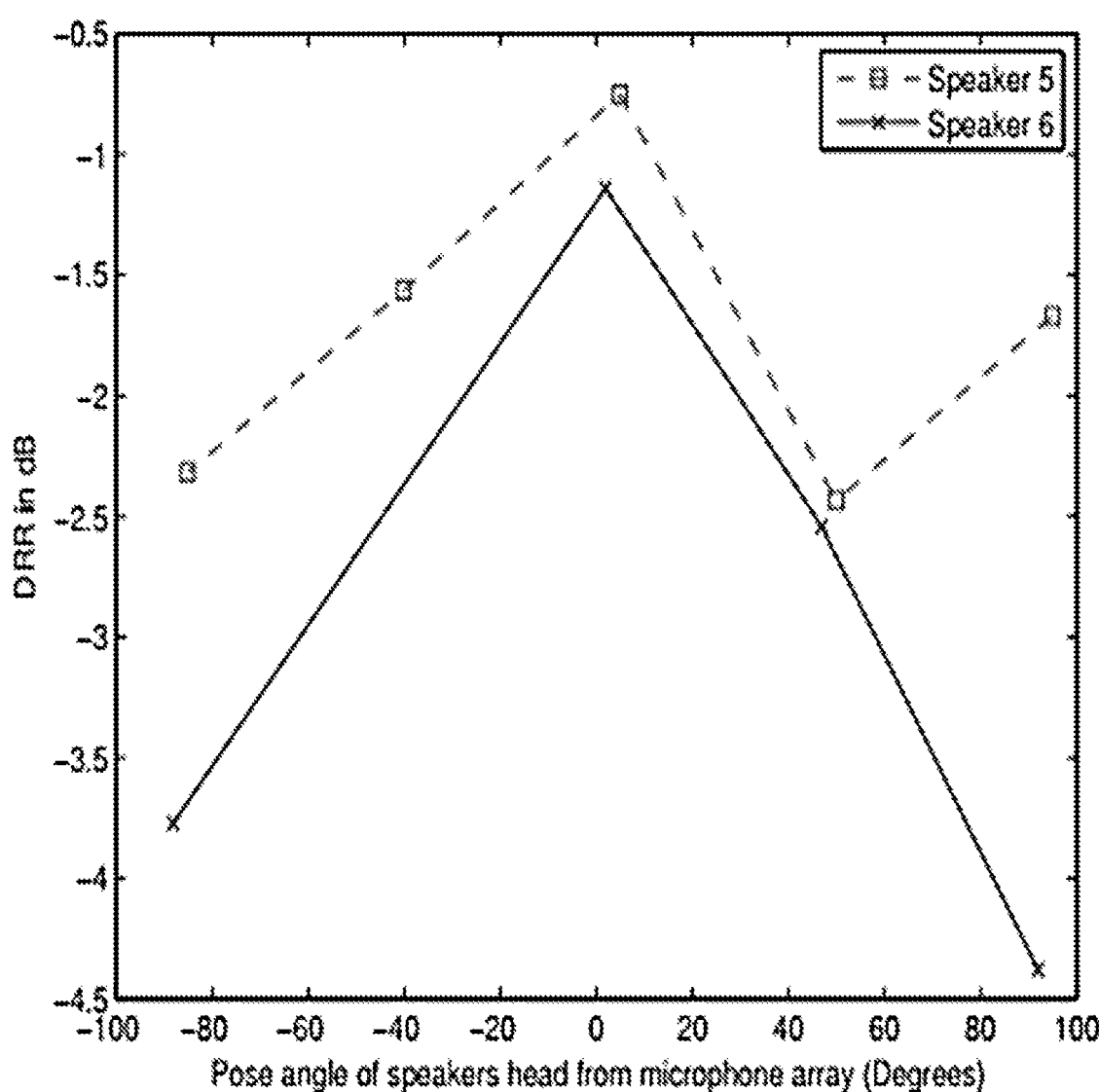
FIG. 3 is a diagram for describing Direct to Reverberant speech energy Ratio (DRR)

Here, DRR means the energy ratio between direct sound and reverberation, as shown in Equation 1. In other words, the deepfake video detection apparatus can analyze the direction of a person's face in the voices in a time series manner by taking advantage of the fact that the DRR value represents a larger value when speaking while looking at the camera (i.e. microphone) located in front of the person appearing in the target video, and the DRR value represents a relatively small value when speaking while turning the head to the left or right. For example, referring to FIG. 3, it can be seen that the DRR value increases when a person speaks while looking at the front, and that the DRR value decreases when a person speaks while turning his or her head to the left or right.

$$DRR = \frac{E_d}{E_r},$$ [Equation 1]

Here, $E_d$ is the energy of the direct sound, and $E_r$ is the energy of the reverberation.

Meanwhile, a deepfake video detection apparatus can calculate the angle of a person's face by calculating the DRR value of the voice at regular intervals along the time axis. For example, the deepfake video detection apparatus may use the graph shown in FIG. 3, use the point with the largest calculated DRR value as a reference point (i.e., 0 degrees), and reflect the difference between the largest DRR value and the calculated DRR value. By doing this, the angle of the person's face can be calculated.

However, while a deepfake video detection apparatus can calculate the angle of a person's face using the DRR value, it may be difficult to accurately calculate whether the face direction is left or right. Therefore, the deepfake video detection apparatus can determine the direction and angle of the person's face as 30 degrees to the right, 25 degrees to the left, etc. by using the image analysis results from the same time point. More specifically, the deepfake video detection apparatus can determine whether the direction of the person's face is left or right from the image analysis results and calculate the angle of the person's face from the voice analysis results.

Finally, in step S130, the deepfake video detection apparatus compares the analysis results of the image and voice to determine whether the target video is a deepfake video.

In other words, the deepfake video detection apparatus compares the results of time series analysis of the direction of the person's face in the image with the results of time series analysis of the direction of the person's face in the voice, and if it is determined that the face directions do not match each other, it can determine that the target video is a deepfake video.

In another embodiment, a deepfake video detection apparatus may determine whether the target video is a deepfake video by comparing the face direction in the image and the face direction in the voice according to the timeline.

At this time, the deepfake video detection apparatus can determine whether the target video is a deepfake video by comparing the directions of the face in the image and the voice using a predetermined error range (e.g., 10 degrees).

Figure 4:
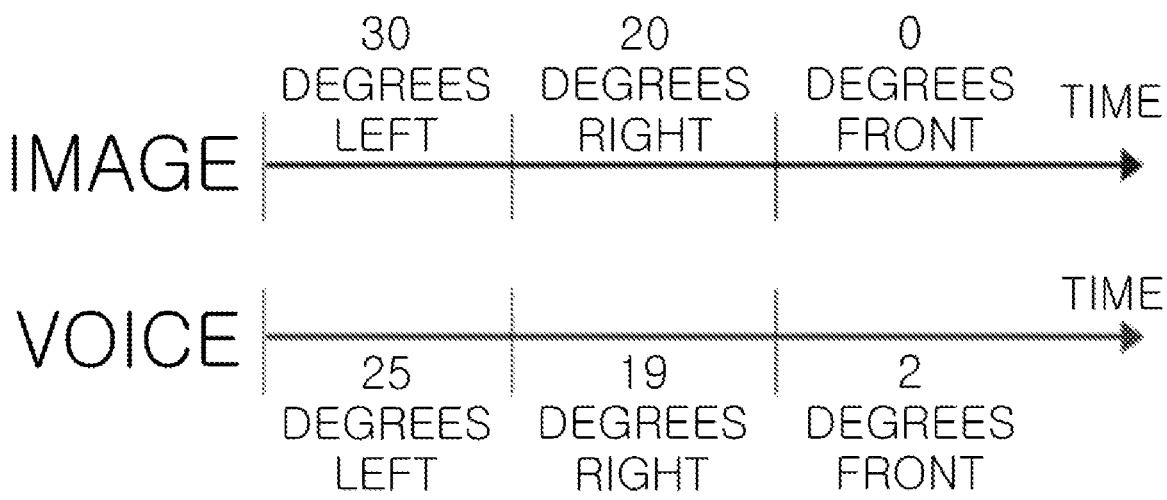
FIGS. 4 and 5 are diagrams for describing the results of image and voice analysis according to an embodiment of the present invention.

For example, referring to FIG. 4, it can be seen that the directions of the face in the image are 30 degrees left, 20 degrees right, and 0 degrees front, and the directions of the face in the voice are 25 degrees left, 19 degrees right, and 2 degrees front.

Comparing this, since 30 degrees left and 25 degrees left are within the error range, 20 degrees right and 19 degrees right are within the error range, and 0 degrees front and 2 degrees front are within the error range, the deepfake video detection apparatus may determine that the voice of the target video has not been altered or manipulated. In other words, the deepfake video detection apparatus can determine that the target video is not a deepfake video.

In another embodiment, a deepfake video detection apparatus can determine whether the target video is a deepfake video by comparing the time when the face direction in the image is changed and the time when the face direction in the voice is changed according to the timeline.

At this time, the deepfake video detection apparatus can determine whether the target video is a deepfake video by comparing the time points of the face direction in the image and the voice using a predetermined error range (e.g., 1 second).

For example, referring to FIG. 5, it can be seen that the time points of changing the face direction in the image are 5 seconds and 12 seconds, and the time points of changing the face direction in the voice are 4 seconds and 12.9 seconds.

Comparing this, since 5 seconds and 4 seconds are within the error range, and 12 seconds and 12.9 seconds are within the error range, the deepfake video detection apparatus can determine that the audio in the target video has not been altered or manipulated. In other words, the deepfake video detection apparatus can determine that the target video is not a deepfake video.

Meanwhile, in order to detect deepfake videos under stricter standards, the deepfake video detection apparatus compares both the face direction and time point of changing face direction in the image and voice in the target video, and if any of them do not match, it can determine that the target video is a deepfake video.

Figure 2:
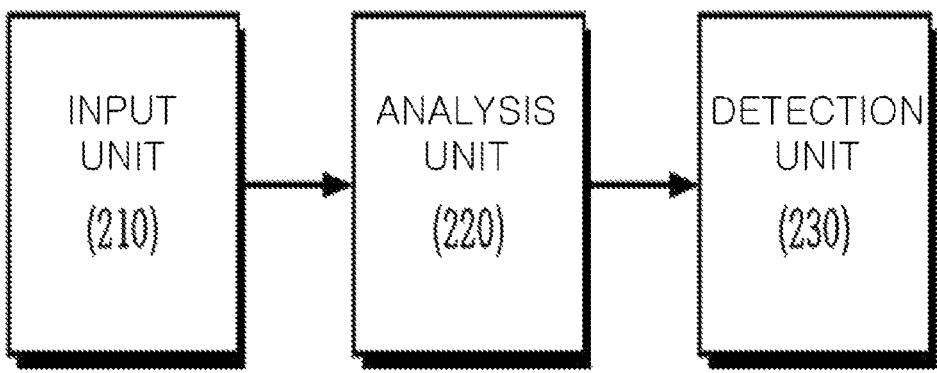
FIG. 2 is a block diagram of a voice-based deepfake video detection apparatus according to an embodiment of the present invention.

FIG. 2 is a block diagram of a voice-based deepfake video detection apparatus according to an embodiment of the present invention.

Referring to FIG. 2, the voice-based deepfake video detection apparatus 200 according to an embodiment of the present invention comprises an input unit 210, an analysis unit 220, and a detection unit 230.

At this time, the voice-based deepfake video detection apparatus 200 according to an embodiment of the present invention can be mounted on computing devices such as smartphones, tablet PCs, laptop PCs, desktop PCs, and server computers.

The input unit 210 receives a target video, which is a video containing a person speaking.

The analysis unit 220 analyzes the direction of the person's face in time series for each of the image and voice constituting the target video.

In another embodiment, the analysis unit 220 may analyze the direction of the person's face in the image in time series using a pre-trained object detection deep learning model.

In another embodiment, the analysis unit 220 may analyze the direction of the person's face in the voice in time series based on DRR.

Finally, the detection unit 230 compares the analysis results of the image and voice to determine whether the target video is a deepfake video.

In another embodiment, the detection unit 230 may determine whether the target video is a deepfake video by comparing the face direction in the image and the face direction in the voice according to the timeline.

In another embodiment, the detection unit 230 may determine whether the target video is a deepfake video by comparing the time when the face direction in the image is changed and the time when the face direction in the voice is changed according to the timeline.

Although the technical idea according to the present disclosure has been described above through various embodiments, the technical idea according to the present disclosure comprises various substitutions, modifications and changes that can be made within the range that can be understood by a person skilled in the art to which the present disclosure pertains. Additionally, it is to be understood that such substitutions, modifications and alterations may be included within the scope of the appended claims.

The invention claimed is:

1. A method for detecting a deepfake video comprising:

receiving a target video, which is a video containing a person speaking;

analyzing a direction of the person's face in time series for each of an image and voice constituting the target video; and determining whether the target video is a deepfake video by comparing analysis results of the image and the voice, wherein determining whether the target video is a deepfake video comprises, determining whether the target video is a deepfake video by comparing a direction of the face in the image and a direction of the face in the voice according to timeline, determining whether the target video is a deepfake video by comparing a time when a direction of the face in the image is changed and a time when a direction of the face in the voice is changed according to timeline.

2. The method of claim 1, wherein analyzing the direction of the person's face in time series comprises, analyzing the direction of the person's face in the image in time series using a pre-trained object detection deep learning model.

3. The method of claim 1, wherein analyzing the direction of the person's face in time series comprises, analyzing the direction of the person's face in the voice in time series based on DRR (Direct to Reverberant speech energy ratio).

4. An apparatus for detecting a deepfake video comprising:

an input unit for receiving a target video, which is a video containing a person speaking;

an analysis unit for analyzing a direction of the person's face in time series for each of an image and voice constituting the target video; and a detection unit for determining whether the target video is a deepfake video by comparing analysis results of the image and the voice, wherein the detection unit determines whether the target video is a deepfake video by comparing a direction of the face in the image and a direction of the face in the voice according to timeline, wherein the detection unit determines whether the target video is a deepfake video by comparing a time when a direction of the face in the image is changed and a time when a direction of the face in the voice is changed according to timeline.

5. The apparatus of claim 4, wherein the analysis unit analyzes the direction of the person's face in the image in time series using a pre-trained object detection deep learning model.

6. The apparatus of claim 4, wherein the analysis unit analyzes the direction of the person's face in the voice in time series based on DRR.

* * * * *